Patented Jan. 12, 1954

2,666,069

UNITED STATES PATENT OFFICE 2,666,069

METHOD OF PREPARING Δ⁴-PREGNENES

Seymour Bernstein and Rose Mary Antonucci, Pearl River, and Milton D. Heller, Monsey, N. Y., assignors to American Cyanamid Company, New York, N. Y., a corporation of Maine No Drawing. Application December 4, 1951, Serial No. 259,903

4 Claims. (Cl. 260—397.4)

This invention relates to a new method for the preparation of Δ⁴-pregnenes. More particularly, it relates to a method for the preparation of Δ⁴-pregnene-11β,17α,21-triol-3,20-dione.

Recently interest in the steroid field has been greatly stimulated by the discovery that cortisone can be used not only in the treatment of rheumatic diseases but in the treatment of a wide variety of pathological conditions. The compound cortisone which occurs naturally in the adrenal cortex is also known as Kendall's "Compound E." Cortisone may be described chemically as Δ⁴-pregnene-17α,21-diol-3,11,20-trione. A compound structurally related to cortisone has also been described by Kendall and others and has been given the name Kendall's "Compound F." "Compound F" differs from cortisone in having a hydroxyl radical in place of a keto group in the 11-position. Published results on the activity of "Compound F" have been somewhat meager in the literature primarily because of the very limited amounts of "Compound F" available for clinical study. The results thus far reported appear to indicate that "Compound F" may be more active than cortisone itself. Indeed, reports in the literature have indicated that "Compound F," and not cortisone, is the true hormone of the adrenal cortex. It is therefore desirable that a method be available which is capable of producing "Compound F" in good yields.

"Compound F" has the following structural formula:

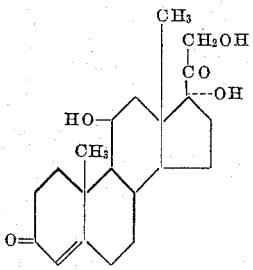

We have found that this compound can be prepared in good yields from Δ⁵-pregnene-11β,17α,21-triol-3,20-dione di-ethylene ketal. The reaction to prepare the compound of the present invention may be illustrated by the following equation:

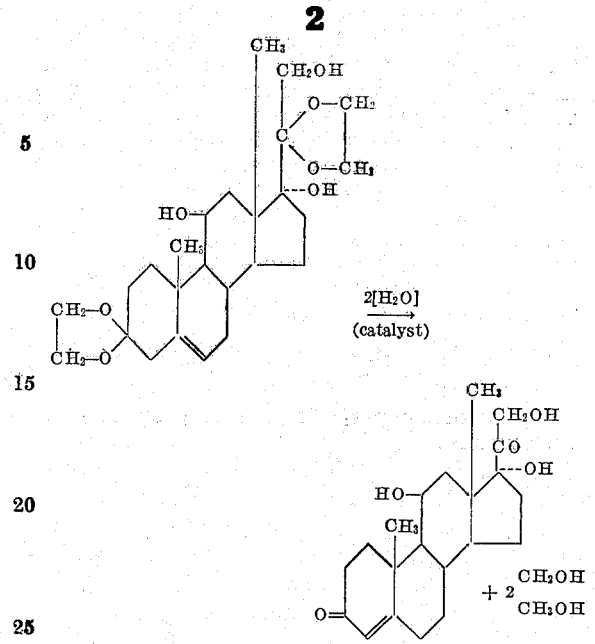

The intermediate used in the above illustrated process can be prepared from cortisone by reacting cortisone with ethylene glycol and subsequently with lithium aluminum hydride in a solvent. These products and their method of preparation are described and claimed in our copending application, Serial No. 259,902, filed December 4, 1951, now Patent No. 2,622,081, issued December 16, 1952.

The process of the present invention is carried out in a solvent in the presence of a mineral acid and water. The solvent may be an alcohol such as methyl, ethyl, propyl, butyl or amyl alcohol, dioxane or a ketone such as acetone, methyl ethyl ketone and the like.

The process is usually carried out at a temperature within the range of 20° C. to about 150° C. It is preferable to carry out the reaction at the refluxing temperature of the particular solvent used. At these temperatures the reaction is usually complete in a matter of 15 minutes to about 2 hours. However, the reaction may be made to take place at room temperature by allowing the reaction mixture to stand at room temperature for a period up to 24 hours.

In carrying out the reaction it is also necessary to have present a mineral acid which acts as a catalyst. The preferred mineral acid for the present process is sulfuric acid, although, if desired, other acids such as hydrochloric, hydrobromic, etc., can be used.

The product is recovered from the reaction mixture by neutralizing the reaction mixture with mild alkali, such as sodium bicarbonate, and removing the solvent by evaporation under reduced pressure. The residual mixture is then extracted with a solvent such as ethyl acetate, and upon evaporation of the solvent the product is obtained as a crystalline material. The product can be further purified by crystallization from an organic solvent or mixture of organic solvents such as acetone and petroleum ether.

The following example illustrates the preparation of $\Delta^4$-pregnene-11$\beta$,17$\alpha$,21-diol-3,20-dione (Kendall's "Compound F") by the method of the present invention.

A mixture of 70 mg. of $\Delta^5$-pregnene-11$\beta$,17$\alpha$,21-triol-3,20-dione di-ethylene ketal, 7 ml. of ethanol and 0.7 ml. of 8.5% sulfuric acid (v./v.) was refluxed for one and one-third hours. The cooled reaction mixture was neutralized with a solution of sodium bicarbonate and was concentrated under reduced pressure for the removal of ethanol. The residual mixture was extracted with ethyl acetate. The residue obtained upon evaporation of the ethyl acetate was crystallized from acetone-petroleum ether (boiling point 64°–66° C.), weight 21 mg. The recrystallizations from acetone-petroleum ether (boiling point 64°–66° C.) gave 16 mg. of $\Delta^4$-pregnene-11$\beta$,17$\alpha$,21-triol-3,20-dione (Kendall's "Compound F"), melting point 204°–205.5° C., with previous browning.

$\lambda \, ^{absolute\ alcohol}_{maximum}$ 242$m\mu$, $\epsilon$14,800, $[\alpha]^{28}_{D}+149°$ C., $[\alpha]^{28}_{Hg}+191°$ C.

We claim:

1. A method of preparing the compound having the formula:

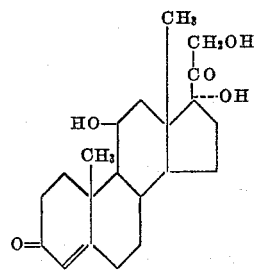

which comprises reacting $\Delta^5$-pregnene-11$\beta$,17$\alpha$,21-triol-3,20-dione diethylene ketal with water in the presence of a solvent and a mineral acid and recovering said compound therefrom.

2. A method of preparing $\Delta^4$-pregnene-11$\beta$,17$\alpha$,21-triol-3,20-dione which comprises reacting $\Delta^5$-pregnene-11$\beta$,17$\alpha$,21-triol-3,20-dione di-ethylene ketal with water in the presence of a solvent and sulfuric acid.

3. A method of preparing $\Delta^4$-pregnene-11$\beta$,17$\alpha$,21-triol-3,20-dione which comprises reacting $\Delta^5$-pregnene-11$\beta$,17$\alpha$,21-triol-3,20-dione di-ethylene ketal with water in the presence of a lower aliphatic alcohol and a mineral acid and recovering said compound therefrom.

4. A method of preparing $\Delta^4$-pregnene-11$\beta$,17$\alpha$,21-triol-3,20-dione which comprises reacting $\Delta^5$-pregnene-11$\beta$,17$\alpha$,21-triol-3,20-dione di-ethylene ketal with water in the presence of ethanol and sulfuric acid and recovering said compound therefrom.

SEYMOUR BERNSTEIN.
ROSE MARY ANTONUCCI.
MILTON D. HELLER.

References Cited in the file of this patent

UNITED STATES PATENTS

| Number | Name | Date |
|---|---|---|
| 2,356,154 | Fernholz | Aug. 22, 1944 |